Aug. 26, 1969

H. L. RATLIFF, JR 3,463,570

WIDE-ANGLE STEREOSCOPIC VIEWER

Filed Feb. 10, 1964

INVENTOR

Harvey L. Ratliff Jr.

Aug. 26, 1969   H. L. RATLIFF, JR   3,463,570
WIDE-ANGLE STEREOSCOPIC VIEWER
Filed Feb. 10, 1964   6 Sheets-Sheet 2
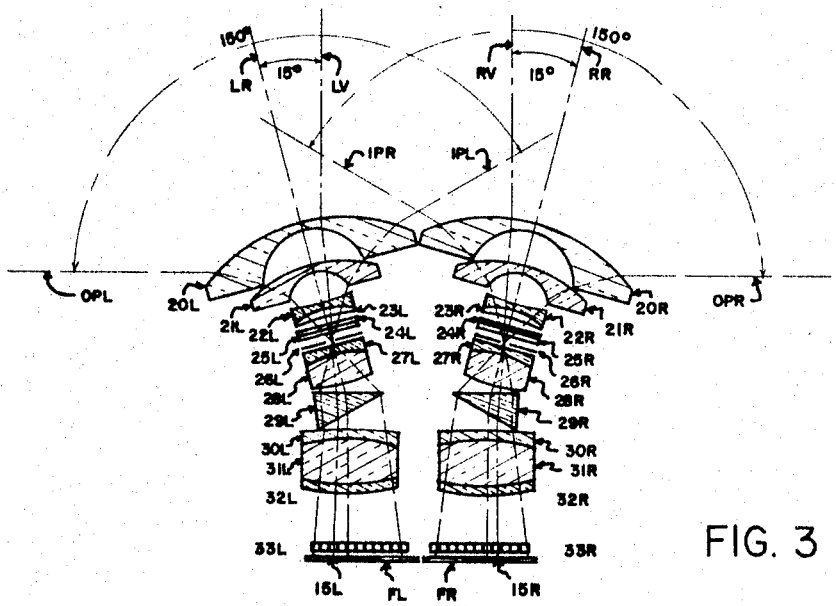
FIG. 3
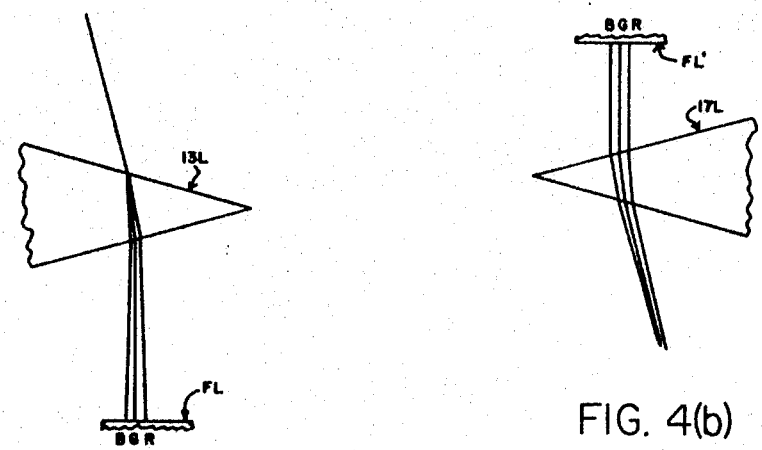
FIG. 4(a)
FIG. 4(b)
INVENTOR
Harvey L. Ratliff Jr.

Aug. 26, 1969  H. L. RATLIFF, JR  3,463,570
WIDE-ANGLE STEREOSCOPIC VIEWER
Filed Feb. 10, 1964  6 Sheets-Sheet 3

INVENTOR
Harvey L. Ratliff Jr.

INVENTOR
Harvey L. Ratliff Jr.

Aug. 26, 1969 H. L. RATLIFF, JR 3,463,570
WIDE-ANGLE STEREOSCOPIC VIEWER
Filed Feb. 10, 1964 6 Sheets-Sheet 6

INVENTOR
Harvey L. Ratliff Jr.

United States Patent Office 3,463,570
Patented Aug. 26, 1969

3,463,570
WIDE-ANGLE STEREOSCOPIC VIEWER
Harvey L. Ratliff, Jr., Amarillo, Tex., assignor, by direct and mesne assignments, of ninety-five percent to Jetru Inc. and five percent to Maymie T. May Trusts, Amarillo, Tex.
Filed Feb. 10, 1964, Ser. No. 343,841
Int. Cl. G02b 27/22
U.S. Cl. 350—134          5 Claims

ABSTRACT OF THE DISCLOSURE

An substantially distortion free apparatus for viewing wide-angle stereoscopic pictures utilizing a lens system with wide-angle oculars and large wedges whereby the pictures are placed at a flat object plane and the scene is recreated about right and left axes which are respectively rotated some 15° to the right and left of the respective axes of the right and left eye view to thus increase the angle of horizontal view some 30° more than is possible for any specifically sized ocular diameter placed any specific distance from the eyes of an observer.

---

This invention relates generally to extremely wide-angle stereoscopes and to processes for making wide-angle stereoscopic pictures and particularly an instrument for viewing extremely wide-angle stereoscopic pictures and processes for making the pictures therefor.

Heretofore, it has been impossible from the teachings of the prior art to make and view wide-angle stereoscopic scenes which are recorded on flat film, and which create the sensation of 180° or more peripheral vision in the horizontal plane and 135° or more in the vertical plane.

It is therefore, the primary object of the present invention to devise a wide-angle stereoscopic process and device capable of recreating from flat separate photographs, stereoscopic scenes having an angle of view of approximately 180° or more in the horizontal plane and 135° or more in the vertical plane for viewing observers.

It is a second object of this invention to devise the wide-angle stereoscopic device such that it is especially adapted for viewing the extremely wide-angle stereoscopic pictures from photographs arranged in circular or disc form, whereby the disc can be inserted and removed with a minimum amount of effort, skill or care on the part of the user.

The third object is to construct the device in a manner that it may be easy to manufacture and not easily rendered inoperative, and the fourth object of this invention is to include the employment of a manner of recording two pictures on the same film to thereby make it possible to have twice as many scenes on the same disc.

Conventional systems of stereoscopic photography are subject to a variety of limitations which seriously affect their usefulness. Among the defects of known systems are the "window effect" which causes the image to appear as though it were viewed through a distant window without particular spatial relation to the dark surround. Thus the stereoscopic effect must often be exaggerated to produce the desired illusion of stereoscopic perception. Another limitation is the narrow angle of view which may be achieved in the conventional stereoscopic system as distinguished from the normal scope of human vision which normally well exceeds 180° horizontally and 120° vertically, and this usual restriction upon the stereoscopic viewing of a photograph results in unrealistic appearance of the entire view to the viewer, which is avoided by the system of the present invention. It is a fourth object of the present invention to eliminate these defects. There is prior art which overcomes the defects mentioned in this paragraph; however the system of the prior art requires an array of some thirty lenses to be used in the recording camera and an array of some thirty lenses to be used in the viewing stereoscope. Also the system of the prior art requires spherical or cylindrical film for recording and viewing. This system thereby substitutes a multiplicity of "window effects" for the single "window effect" of the hereinabove mentioned conventional systems, introduces a great many manufacturing problems which do not exist for the present invention, and requires much more skill, effort, and care on the part of the person who uses the stereoscope and who stores the stereoscopic photographs than does the system of the present invention.

Also there is prior art which teaches systems which have as many conveniences as the present invention, but none of the prior art teaches a combination which makes possible both the conveniences and the wide-angle of view (180° horizontally and 135° vertically) of the present invention.

Other objects and advantages of my invention will become apparent from a study of the following description taken with the accompanying drawings wherein:

FIG. 1 diagrammatically illustrates a recording system utilized in one mode of practicing the present invention.

FIG. 2 diagrammatically illustrates a viewing system utilized in one mode of practicing the present invention.

FIG. 3 diagrammatically illustrates another recording system utilized in another mode of practicing the present invention.

FIG. 4 diagrammatically illustrates some basic principles involved in the present invention.

FIG. 5 diagrammatically illustrates a basic system of the present invention.

FIG. 6 diagrammatically illustrates a basic system of the present invention.

Figure 5:
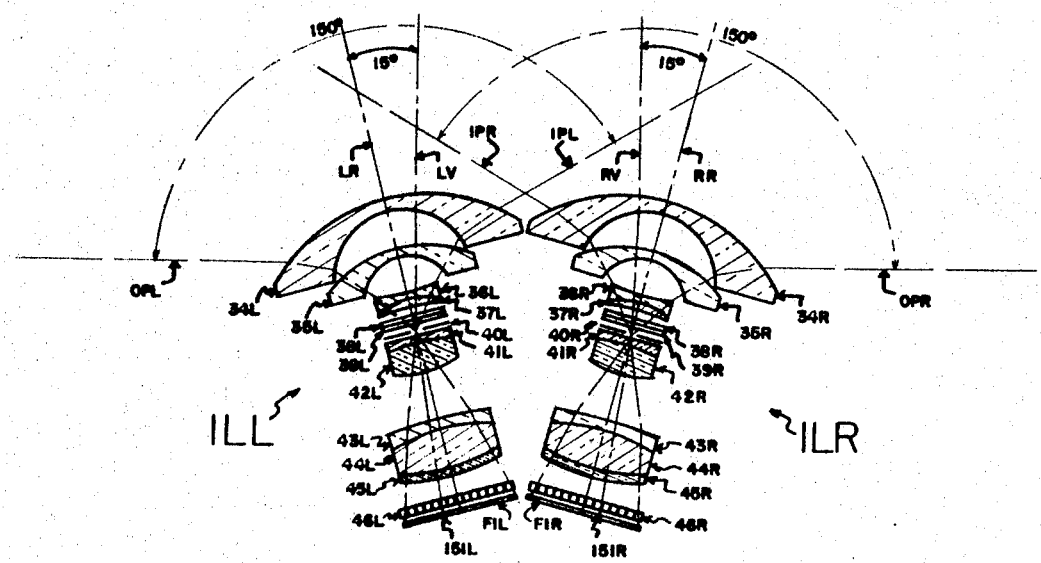
Figure 6:
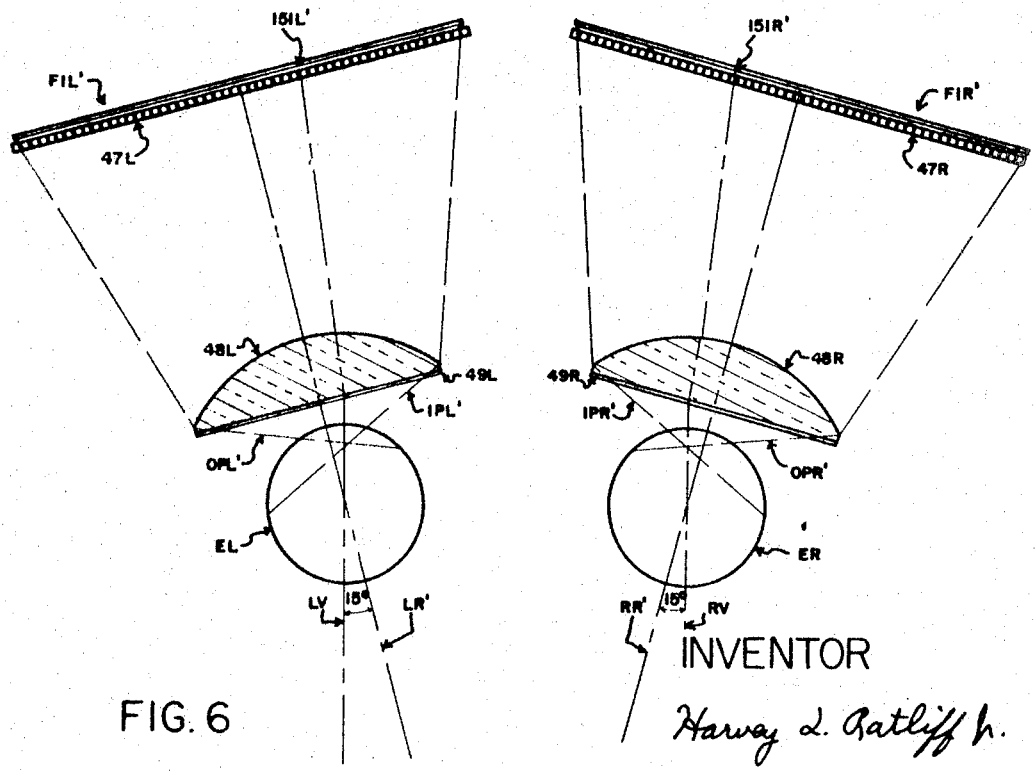
Figure 7:
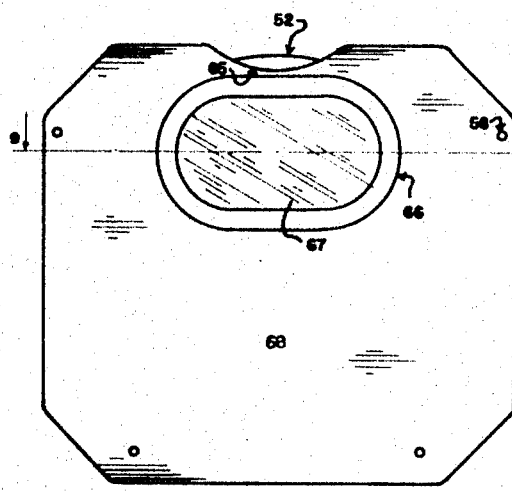
FIG. 7 is a direct front elevation of a contemplate device for practicing the present invention.

Referring more particularly to the drawings, reference is first made to FIGS. 5 and 6. It may be seen by observing FIG. 6 that among the factors determining the angle of peripheral vision sensed by a viewing observer viewing into a stereoscope are: the area of vision allowed by the eyepiece lenses (such as 48L and 48R) and the distance each eyepiece lens is away from each respective eye of the viewing observer viewing thereinto. It may now be seen that if the horizontal diameter of each lens (48L and 48R) is 38 millimeters and each lens is shaped and supported such that each lens can be placed within 5 millimeters of each eye (EL and ER respectively) a viewing observer can be made to sense peripheral vision in excess of 150° with each eye. It may also now be seen that if the horizontal diameter is 38 millimeters, the radius of curvature of lenses 48L and 48R could be as low as 19 millimeters (or even lower if the system described in the description of FIGS. 33–40 of my copending application 275,411 filed April 24, 1963 is used to grind the lenses). Therefore, focal lengths shorter than 50 millimeters are possible under these conditions.

One of the basic aspects of the present invention is that of rotating the recording axis of left eye view LR of FIG. 5, 15° to the left of and in the same plane with axis LV which corresponds to the axis of left eye view and that of rotating the recording axis of right eye view RR of FIG. 5, 15° to the right of and in the same plane with the two aforementioned axis and with axis RV which corresponds to the axis of right eye view. Each lens system of the recording process of the present invention is the basic arrangement of the well known "Nikon Fish Eye." However, it is not necessary to record views having greater angles of view than 150°, and any well known lens that can accomplish this is within the scope of the present invention.

Since LR was rotated 15° to the left of LV in the recording procedure, the axis of reproduction LR' can be rotated 15° to the left of the axis of left eye view LV of EL, and since RR was rotated 15° to the right of RV in the recording procedure, the axis of reproduction RR' can be rotated 15° to the right of the axis of right eye view RV of EL. This makes it possible for the hereinabove described lens having a 38 mm. horizontal diameter, a less than 50 mm. focal length, and being constructed such and placed such that it is less than 5 mm. from each eye (EL and ER) to reconstruct a scene that creates the sensation of more than 180° peripheral vision in the horizontal plane.

At this point FIGS. 5 and 6 will be considered in greater detail. Each lens system of FIG. 5 has a collector lens system which is made up of large negative meniscus lenses 34L or 34R, and negative meniscus lenses 35L or 35R, a first achromatic lens system made up of lenses 36L and 37L or 36R or 37R, filtering elements 38L or 38R, polarizing filtering elements 39L or 39R (which may be left out in one form of the invention which will be described hereinafter), apertures 40L or 40R, a second achromatic lens system made up of lenses 41L and 42L or 41R and 42R, and a third positive achromatic lens system made up of lenses 43L, 44L, and 45L or 43R, 44R and 45R.

The lens systems are arranged such that LV and RV shown in FIG. 5 are approximately 65 millimeters apart, that LR is rotated 15° to the left of and in the same plane with LV and that RR is rotated 15° to the right of and in the same plane with RV, LV, and LR. The focal length of lens systems ILL and ILR of FIG. 5 is made as short as is possible while still accomplishing the purposes of the present invention.

All right eye view rays within a 150° cone defined by outside peripheral ray OPR and inside peripheral ray IPR and within 75° in every direction from recording axis RR pass through lens 34R, lens 35R, the first right achromatic lens system, filtering elements 38R and maybe 39R, aperture 40R, and second right achromatic lens system, the third right achromatic lens system, maybe pass through a polarizing differentiating filter 46R, and are focused upon photo sensitive film FIR. The rays entering along axis RV are focused at point 151R. All left eye view rays within a 150° cone defined by outside peripheral ray OPL and inside peripheral ray IPL and within 75° in every direction from recording axis LR pass through lens 34L, lens 35L, the first left achromatic lens system, filtering elements 38L and maybe 39L, aperture 40L, the second left achromatic lens system, the third left achromatic lens system, maybe pass through a polarizing differentiating filter 46L, and are focused upon photo sensitive film FIL. The rays entering along axis LV are focused at point 151L.

The pictures recorded upon film FIR and FIL may then be developed and enlarged in well known manners such as to be the proper size consistent with the focal length of lenses or lens systems represented by 48R and 48L. If filtering elements 39L, 39R, 46L, and 46R are used in the recording procedure, filters 47L, 47R, 49L, and 49R may be used in the viewing procedure. The structural arrangement and function of these filters will be described in greater detail hereinafter. Rays of light leaving film FIR' (which is the enlargement of FIR) are converged by lens 48R (or the lens system represented thereby) such that the rays of light appear to the right eye ER of the viewing observer to originate at points several feet therefrom. All the rays leaving FIR' enter the right eye within a cone which is 75° in every direction about axis RR' defined by OPR' and IPR' and have substantially the same corresponding relation to axis RR' they had to axis RR when entering lens system ILR of FIG. 5. The ray which corresponded to axis RV in FIG. 5 originates at point 151R' and enters the eye along axis RV of FIG. 6. Rays of light leaving film FIL' (which is the enlargement of FIL) are converged by lens 48L (or the lens system represented thereby) such that the rays of light appear to the left eye EL of the viewing observer to originate at points several feet therefrom. All the rays leaving FIL' enter the left eye EL within a cone which is 75° in every direction about axis LR' defined by OPL' and IPL' and have substantially the same corresponding relation to axis LR' they had to axis LR when entering lens system ILL of FIG. 5. The ray which corresponds to axis LV in FIG. 5 originates at point 151L' and enters the eye along axis LV of FIG. 6. These conditions working together make it possible for a person to have reproduced before him or her a right eye view which is 75° in every direction about axis RR', and to have reproduced before him or her a left eye view which is 75° in every direction about axis LR'. This means that he or she can see approximately 90° to the right of RV and 90° to the left of LV to create the sensation 180° horizontal peripheral vision. If lenses 48R and 48L are designed to fill up all the vertical space of the average eye socket of viewing observers and also designed to be placed within 5 millimeters of each eye of the viewing observer, the sensation of substantially total vertical peripheral vision may be created.

Figure 1:
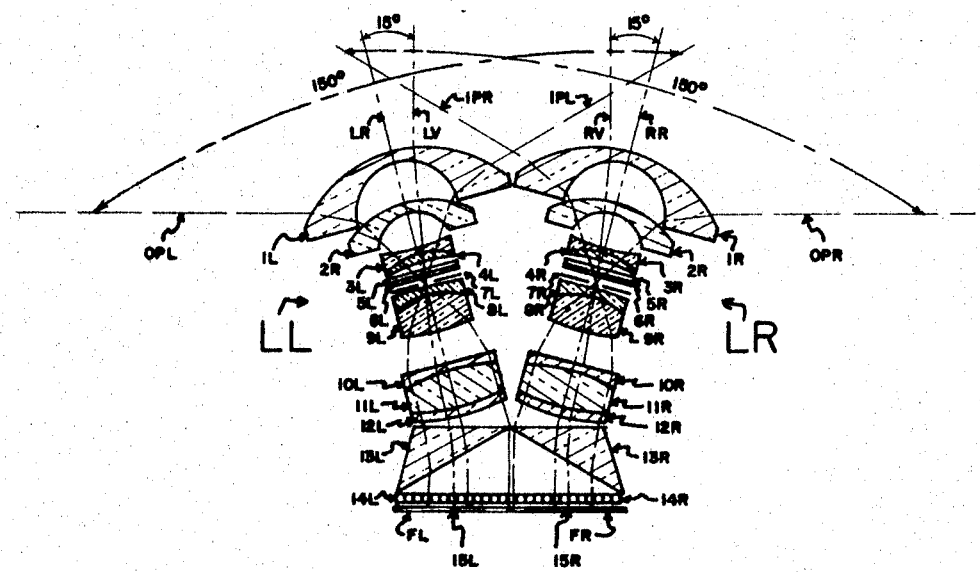

Reference is now made to FIGS. 1, 3, and 5. Elements 1R and 1L, 2R and 2L, 3R and 3L, 4R and 4L, 5R and 5L, 6R and 6L, 7R and 7L, 8R and 8L, 9R and 9L, 10R and 10L, 11R and 11L, 12R and 12L, 14R and 14L, and FR and FL of FIG. 1 and elements 20R and 20L, 21R and 21L, 22R and 22L, 23R and 23L, 24R and 24L, 25R and 25L, 26R and 26L, 27R and 27L, 28R and 28L, 30R and 30L, 31R and 31L, 32R and 32L, 33R and 33L, and film FR and FL respectively of FIG. 3 each have the same function as the hereinabove described elements 34R and 34L, 35R and 35L, 36R and 36L, 37R 38R and 38L, 39R and 39L, 40R and 40L, 41R and 41L, 42R and 42L, 43R and 43L, 44R and 44L, 45R and 45L, 46R and 46L, and film FIR and FIL respectively of FIG. 5. In FIG. 1 prismatic wedges 13R and 13L are placed between the above described third achromatic lens systems and polarizing differentiating elements 14R and 14L respectively (if they are used and film elements FR and FL respectively if they are not used.) In FIG. 3 prismatic wedges 29R and 29L are placed between the above described second achromatic lens systems and the third achromatic lens systems.

The optical path (which is the term defined in section 1.5 on pages 6 and 7 of Fundamentals of Optics by Jenkins and White, third edition, published by McGraw-Hill 1957) of the rays within the cone defined by OPR and IPR described hereinabove and of the rays within the cone defined by OPL and IPL described hereinabove is substantially the same for the corresponding entering rays of FIGS. 1, 3, and 5. This truth makes two important things possible: first it makes it possible to focus the right eye view wide-angle image and the left eye view wide-angle image on films FR and FL respectively of FIGS. 1 and 3 when each of said films are in the same plane; second it makes it possible to expose films FR and FL to images which are distorted in a manner which will make them appear proper when viewed by a viewing observer when viewing through the contemplated viewer of the present invention. Actually these two things could also be accomplished in the enlargement procedure by using a prismatic wedge therein. It is pointed out that such use of a prismatic wedge in the enlargement procedure is anticipated by the present specification, although it and other modes of practicing the present invention are not specifically set forth. Since in the specific mode of practicing the present invention set forth herein the recording axii are rotated 15° from the viewing axii, 15° wedges are used in this particular mode of practicing the invention. Rays entering along RV and LV are focused and recorded at 15R and 15L respectively in both FIG. 1 and FIG. 3.

Figure 2:
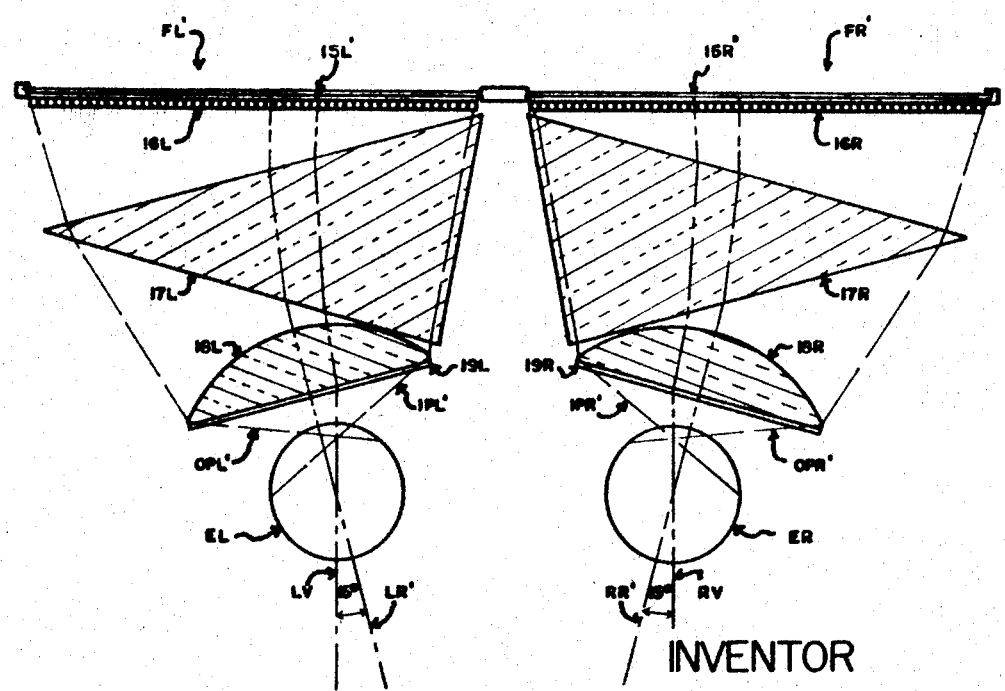

The optical path of the rays leaving films FR' and FL' of FIG. 2 is also substantially the same as it is for the corresponding rays leaving films FIR' and FIL' respectively of FIG. 6, because of prismatic wedges 17R and 17L respectively. This also makes it possible for film FR' (which is the enlargement of film FR) to be in the same plane with film FL' (which is the enlargement of film FL). The characteristics of elements FR' and FL', 16R and 16L, 18R and 18L, and 19R and 19L are substantially the same as the characteristics of elements FIR' and FIL', 47R and 47L, 48R and 48L, and 49R and 49L of FIG. 6 described hereinabove. Rays leaving point 15R' (which corresponds to point 15R of FIG. 1) enter the eye ER of FIG. 2 along axis RV, and all the other rays enter ER in substantially the same manner as their corresponding ray entered LR of FIG. 1. Rays leaving point 15L' of FIG. 2 (which corresponds to point 15L of FIG. 1) enter the eye EL along axis LV, and all the other rays enter EL in substantially the same manner as their corresponding ray entered LL of FIG. 1. It is pointed out that since the images recorded upon FR' and FL' are distorted as described hereinabove, the rays enter the eyes ER and EL of FIG. 2 in substantially the same manner they did in FIG. 6.

Reference is now made to FIG. 4. When the light is bent by a wedge such as 13L (see also FIG. 1), it is of course well known that the colors such as blue B, green G, and red R are separated as shown in FIG. 4(a) (but not nearly so much as indicated by FIG. 4(a)). It may be observed that the blue ray is bent the most toward the inside peripheral ray IPL and the red ray is bent the least thereby being closer to outside peripheral ray OPL. By observing FIG. 4(b), it may be seen that in order for a wedge such as 17L (see also FIG. 2) to tend to correct the color separation of FIG. 4(a) (without being a specially constructed achromatic wedge), the blue ray should originate nearer the outside peripheral ray OPL' than should the red ray R. Since this is not the case in practice, it is necessary to make a special achromatic wedge, if high quality achromatism is desired.

Figure 17:
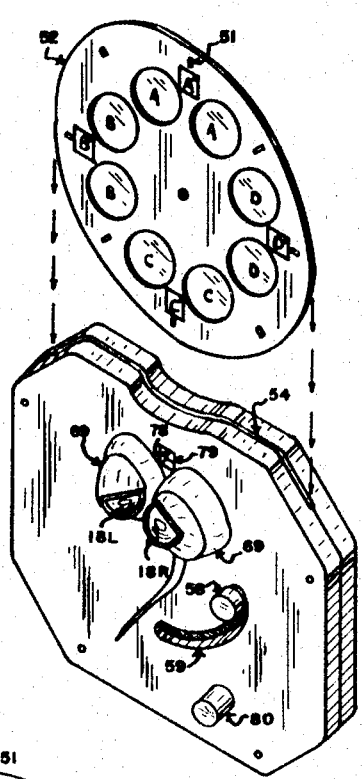
FIG. 17 is a perspective view of a contemplated viewing device showing the manner of inserting the discs.
Figure 18:
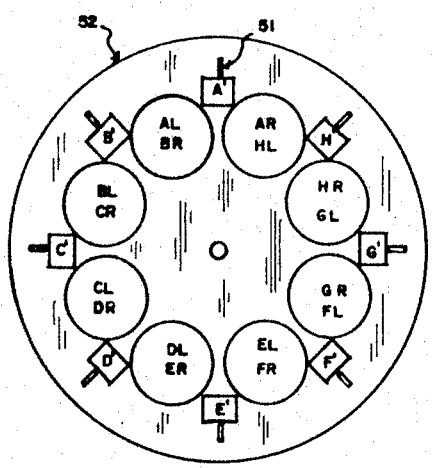
FIG. 18 is a direct rear elevation of a disc used in an alternate form of the present invention.

A specific mode of practicing the veiwing aspect of the present invention will now be set forth. Reference is now made to FIGS. 7-18. There is shown a back 68 having the projections 66 formed thereon. The projection 66 supports diffusion sheet 67 within its aperture. If the polarizing differentiation system which will be described hereinafter is used, eight separate extremely wide-angle scenes may be viewed from a single disc lettered from A to H as shown in FIG. 18. If however, the polarizing differentiation system is not used, only four extremely wide-angle scenes may be viewed from a single disc lettered from A to D as shown in FIG. 17.

Figure 9:
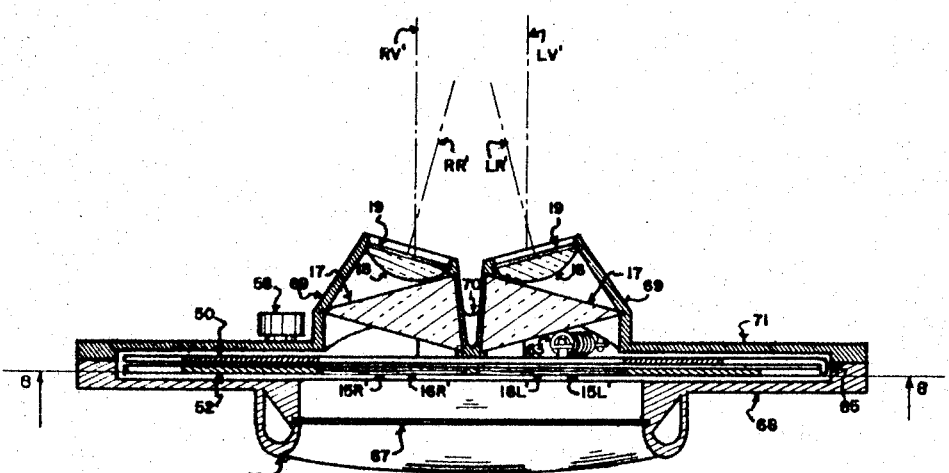
FIG. 9 is a sectional view taken along the line 9—9 in FIG. 7.
Figure 10:
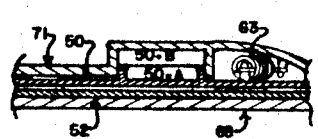
FIG. 10 is a sectional view taken along the line 10—10 in FIG. 8.
Figure 11:
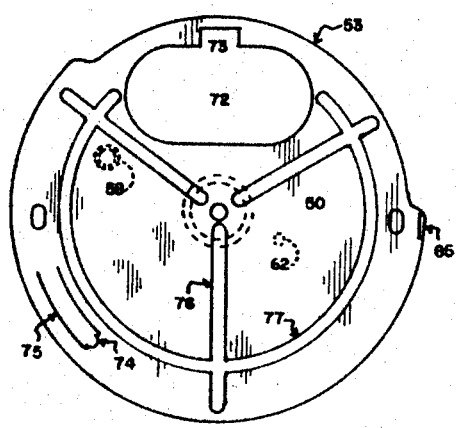
FIG. 11 is a side elevation of a runner.

Mounted in front of back plate 68 is a front plate 71 having the somewhat tapering tubes 69 projecting rearwardly therefrom, spaced to suit the average human eyes and such that lenses 18R and 18L and prismatic wedges 17R and 17L have the same relation to each other and film FR' and FL' described for FIG. 2 hereinabove. In FIG. 9 17L and 17R are both designated by 17, 18L and 18R are both designated by 18, and 19L and 19R are both designated by 19. Lenses 18 and filters 19 (if used) are supported by a retainer within 69. A strengthening rib 70 is provided between elements 69. The members 68 and 71 are joined by means of screws 56 (or their equivalent). Between the member 68 and 71 is formed a pocket or recess 54, the lower portion of which is in the form of a semi-circle, while its sides 55 are substantially parallel and vertical at the same time, tangent with the circular portion of pocket 54. This recess lies within the confines of the back 68 and its purpose is to receive the disc 52.

The front plate 71 is recessed to receive a runner 50, which is also in the form of a disc. The runner 50 is provided with a flange 85 which extends around the side of the disc 52 into circular groove 86 formed therefor in the back 68. The flange 85 serves as a gate which prevents the removal of the disc 52 from runner 50 or its withdrawal from the pocket 54 when the button 58 is rotated away from the position shown in FIGS. 8 and 17.

The center of the runner 50 has formed around same a flange 50–A (see FIG. 10) which journals in the opening 50–B formed in 71. A spring 63 is anchored on the post 64 and attached to the pin 62 of the runner 50 tending to urge it in one direction.

The runner 50 has formed thereon a means to support button 58 which extends outwardly through the slot 59. Button 58 may be used in conjunction with button 80 for finger operation of runner 50, button 80 being rigidly secured to back 71.

Imbedded in the member 68 are the flat springs 61, having means for engaging the radial slots 51 formed in disc 52.

Figure 12:
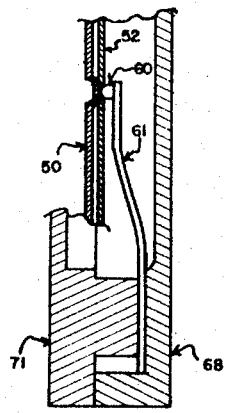
FIG. 12 is a section taken along line 12—12 in FIG. 8.
Figure 13:
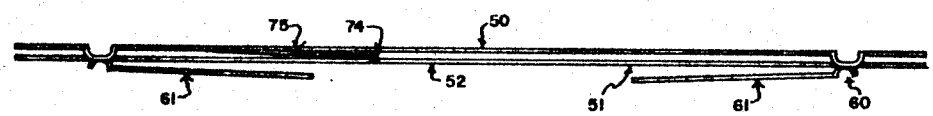
FIG. 13 is an expanded view taken along the line 13—13 in FIG. 8.
Figure 14:
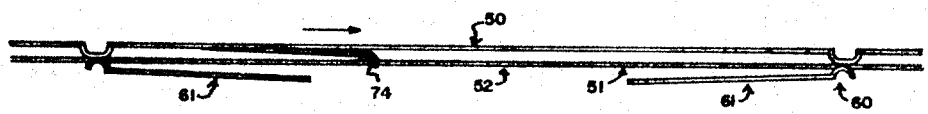
FIG. 14 is a view similar to FIG. 13 showing the parts in position at the start of an indexing movement.
Figure 15:
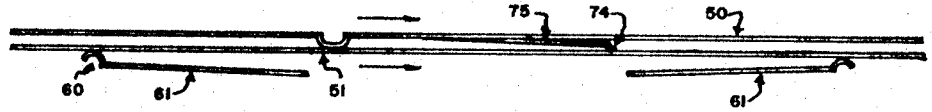
FIG. 15 is a view similar to FIG. 14 but showing the position and movement of the parts nearing the end of the indexing movement.
Figure 16:
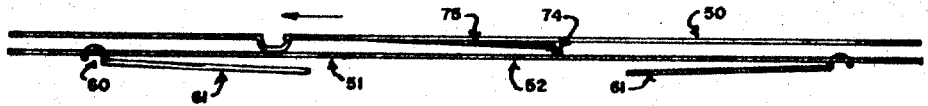
FIG. 16 is a view similar to FIG. 15 showing the position and movement of the parts after the completion of an indexing movement.

It will be noted in FIG. 12 that the pawl 60 on the spring 61 permits the disc 52 to be rotated in one direction while preventing its movement in the opposite direction, that is the springs 61 hold the disc 52 in position after it has been moved by runner 50.

Figure 8:
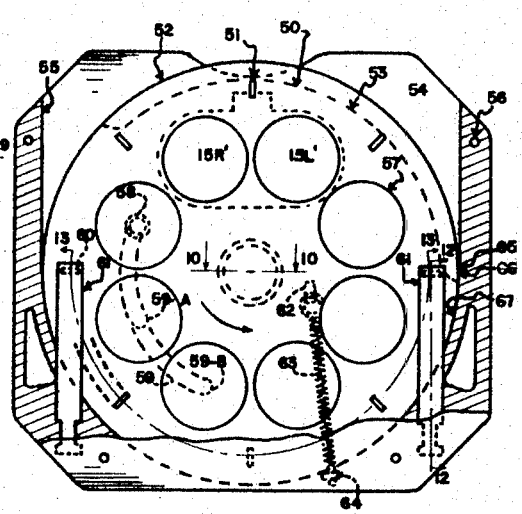
FIG. 8 is a sectional view taken along the line 8—8 in FIG. 9.

The runner 50 has also formed thereon a spring 75 whose pawl 74 also engages the radial slots 51 in the disc 52, as shown in FIG. 8, and permits the runner 50 to drive the disc 52 in one direction when the button 58 is depressed.

It will be noted, however, that when the button 58 is depressed, the flange 85 is in an uppermost position, that is when the button 58 is depressed to position 59–A (in the case where polarizing differentiation is used) or through 45° or to position 59–B (in the case where polarizing differentiation is not used) which is through 90° (see FIG. 8), then the flange 85 is holding in disc 52.

It can be seen from the foregoing that there is provided a viewing device which can be operated by a child without inconvenience or danger to the views or without unnecessary wear thereon. Moreover, the disc can be inserted only when the button 58 is in a raised position. It is desirable to cut the runner 50 along the line 53 in order to expose the disc 52 above the cut-out portion 65 when the button is raised. Obviously, changes may be made in the details of construction without departing from the spirit of this invention. Since the runner 50 is provided with opening 72 and this registers only with openings 57 when the button 58 is raised, it follows that the viewing observer will be distracted by no extraneous photographs, since they will be covered by runner 50.

In the runner 50 is provided a window 73, within which is visible the tile 78 of the particular views and the tile 78 is readable through the opening 79 formed in the back plate 71. Squares A'–D' of FIG. 17 each containing titles 78 and squares A'–H' of FIG. 18 each containing titles 78, each register with openings 73 and 79 when their corresponding photographs are viewed.

It is desirable to provide stiffening ribs 76 and 77 across the surface of runner 50.

Any well known system of polarizing differentiation may be used such as that taught in Patent No. 2,892,383 issued to V. K. Walworth et al. on June 30, 1959 or such as taught by Patent No. 2,315,373 issued to E. H. Land on Mar. 30, 1943, or such as taught by Patent No. 2,385,687 issued to C. W. Carnahan on Sept. 25, 1945, however, it is preferred to use a system which may be seen, from the principles shown in Patent No. 2,317,875 issued to S. W. Athey et al. on April 27, 1943. Elements such as 16L and 16R of FIGS. 2 and 9 and elements such as 14L and 14R of FIG. 1, 33L and 33R of FIG. 3 are made in the manner described in the description of FIGS. 11–18 of the hereinabove cited Athey patent. The dimensions of each alternate conjugately related strip are made such that the strips are beneath the resolving power of the eye. This is well within the capability of the system of Athey since it is limited only by the present day capacity for ruling diffracting gratings (which is smaller than 15,000 lines per inch) which is much smaller than required for the present invention (which requires about 9,000 lines per inch in the recording system and 2,570 lines per inch in the viewing system). This follows since an angle of less than one minute at the eye is recognized as being beneath the resolving power of the eye. Since the angle of view involved is 150°, there are 9,000 minutes involved. If the image exposing the film FR in the recording procedure is slightly more than one inch in diameter, the strips being as small as 9,000 lines per inch would be beneath the resolving power of the eye when viewed in ortho-scopic proportions. Also if the image exposing the film FR' of FIG. 2 in the viewing device is proportionally greater than 3.5 inches the strips as small as 2,570 lines per inch would be beneath the resolving power of the eye when viewed in the ortho-scopic proportions caused by lens 18 of FIG. 9.

As is taught by Athey, polarizing strips having a first axis of polarization are in conjugate alternate relation with polarizing strips having a second axis of polarization, said second axis of polarization being rotated 90° from said first axis of polarization, in the filters 16L, 16R, 14L, 14R, 33L, 33R, 46L, 46R, 47L, and 47R which are used in the present invention. When the exposing process of FIG. 1 is used, for example, filter 6R passes only light which has the aforementioned first axis of polarization; therefore, only the strips of filter 14R which have the first axis of polarization pass light which exposes alternate strips of film FR with the right wide-angle view AR of scene A for example entitled A'. Filter 6L passes only light which has the aforementioned second axis of polarization; therefore, only the strips of filter 14L which have the second axis of polarization pass light which exposes the opposite alternate strips of film FL with the left wide-angle view AL of scene A entitled A'. At this point a disc for the recording apparatus which is identical to the disc of the viewing apparatus (except that it is proportionately smaller) is rotated through 45° in the same manner described hereinabove for the viewing device. Now the film which was exposed to AL upon its opposite alternate strips has become FR and some newly unexposed film becomes FL. Again filter 6R passes only light which has the aforementioned first axis of polarization; therefore, only the strips of filter 14R which have the first axis of polarization pass light which exposes the heretofore unexposed alternate strips of film FR with the right wide-angle view BR of scene B entitled B'. At this point film FR has the opposite alternate strips with AL and the aforementioned alternate strips with BR. Filter 6L passes only light which has the aforementioned second axis of polarization; therefore, only the strips of filter 14L which have the second axis of polarization pass light which exposes the aforementioned opposite alternate strips of film FL with left wide-angle view BL of scene B entitled B'. At this point the disc for the recording apparatus is rotated through 45° as described hereinabove. Now the film which was exposed to BL upon its opposite alternate strips has become FR and some newly unexposed film becomes FL. Again the heretofore unexposed alternate strips of film FR are exposed with the right wide-angle view CR of scene C entitled C', and the opposite alternate strips of film FL are exposed with the left wide-angle view CL of scene C entitled C'. In this manner eight consecutive films may be exposed to sixteen separate wide-angle photographs (eight right eye view photographs and eight left eye view photographs). Each of these photographs are enlarged in a well known manner and placed upon disc 52 as shown in FIG. 18. The titles of the various scenes (A' to H') are also printed in the squares indicated in FIG. 18.

Either the disc of FIG. 17 or the disc of FIG. 18 may be slipped into opening 54 as indicated in FIG. 17. Only the operation of the 8 view disc will be described since the operation of the 4 view disc will be obvious therefrom. After the 8 view disc is inserted in opening 54, button 58 is pushed downward through 45° to position 59–A of FIG. 8. Therefore some title 78 (for Example A') is in registry with opening 79, and the right transparency photograph containing both AR and HL is in registry with the right portion of 72 (see FIG. 11) to thereby assume the position of FR' of FIG. 2, and the left transparency photograph containing both AL and BR is in registry with the left portion of 72 to thereby assume the position FL' of FIG. 2. Again the strips of filter 16R which have the aforementioned first axis of polarization, are in registry with the alternate strips recorded upon FR'. Therefore, light having the first axis of polarization, carries the light from AR. The strips of filter 16R which have the aforementioned second axis of polarization, are in registry with the opposite alternate strips recorded upon FR'. Therefore, light having the second axis of polarization carries the light from HL. Filter 19R passes only light having the aforementioned first axis of polarization; so only light from AR reaches the right eye ER. The strips of filter 16L which have the aforementioned first axis of polarization, are in registry with the alternate strips recorded upon FL'. Therefore, light having the first axis of polarization carries the light from BR. The strips of filter 16L which have the aforementioned second axis of polarization, are in registry with the opposite alternate strips recorded upon FL'. Therefore, light having the second axis of polarization carries the light from AL. Filter 19L passes only light having the second axis of polarization; so only light from AL reaches the left eye EL. Therefore, scene A may be recreated to give the sensation of 180° peripheral vision in the horizontal plane and substantially total peripheral vision in the vertical plane.

At this point button 58 is pushed downward through 45° to position 59–A again. Therefore, title B' is in registry with opening 79, and the right transparency photograph containing both BR and AL is in registry with the right portion of 72 (see FIG. 11) to thereby assure the position of FR' of FIG. 2, and the left transparency photograph containing both BL and CR is in registry with the left portion of 72 to thereby assume position FL' of FIG. 2. Again the strips of filter 16R which have the aforementioned first axis of polarization, are in registry with the alternate strips recorded upon FR'. Therefore, light having the first axis of polarization, carries the light from BR. The strips of filter 16R which have the aforefentioned second axis of polarization, are in registry with the opposite alternate strips recorded upon FR'. Therefore, light having the second axis of polarization carries the light from AL. Filter 19R passes only light having the aforementioned first axis of polarization; so only light from BR reaches the right eye ER. The strips of filter 16L which have the aforementioned first axis of polarization, are in registry with the alternate strips recorded upon FL'. Therefore, light having the first axis of polarization carries the light from CR. The strips of filter 16L which have the aforementioned second axis of polarization, are in registry with the opposite alternate strips recorded upon FL'. Therefore, light having the second axis of polarization carries the light from BL. Filter 19L passes only light having the aforementioned second axis of polarization; so only light from BL reaches the left eye EL. Therefore, scene B may be recreated to give the sensation of 180° peripheral vision in the horizontal plane and substantially total peripheral vision in the vertical plane.

In this manner additional scenes C, D, E, F, G, and H may be viewed sequentially. Each being recreated to give the sensation of 180° peripheral vision in the horizonal plane and substantially total peripheral vision in the vertical plane, from a single disc 52.

While the invention has been disclosed and described in some detail in the drawings and aforegoing description, they are to be considered as illustrative and not restrictive in character, as other modifications may readily suggest themselves to persons skilled in the art and within the broad scope of the invention, reference being had to the appended claims.

What I claim is:

1. A wide-angle stereoscopic viewer comprising: a pair of diverging tubes, the right of said diverging tubes containing right eye optical means including a lens system having a prismatic wedge therein in optical alignment with said lens system such that the most narrow prismatic portion is on the right side of the right tube to reproduce a wide-angle right eye view about an axis which is rotated to the right of the axis of right eye view and lens surfaces with their radii of curvature respectively oriented optically for converging the rays from an object plane of said lens system such that the rays from a flat fisheye picture thereat would enter an observer's right eye substantially as they entered the right fisheye taken lens when the flat fisheye picture is of a size whereby said radii of curvature and their orientation substantially nullify the inherent distortion of the fisheye picture, the left of said diverging tubes containing left eye optical means including a lens system having a prismatic wedge therein in optical alignment with said lens system such that the most narrow prismatic portion is on the left side of the left tube to reproduce a wide-angle left eye view about an axis which is rotated to the left of the axis of left eye view and lens surfaces with their radii of curvature respectively oriented optically for converging the rays from an object plane of said lens system such that the rays from a flat fisheye picture thereat would enter an observer's left eye substantially as they entered the left fisheye taking lens when the flat fisheye picture is of a size whereby said radii of curvature and their orientation substantially nullify the inherent distortion of the fisheye picture, said right and left eye optical means including wide-angle eye pieces adapted to fit relatively close to the eyes of a viewing observer to provide a 3-D effect with an angle of horizontal peripheral vision as great as the angle of peripheral vision allowed by said eye pieces plus the angle of divergence between said axis which is rotated to the right of the axis of right eye view and said axis which is rotated to the left of said axis of left eye view, said angle of divergence being so dimensioned that a right eye view flat photograph having said size does not overlap a left eye view flat photograph having said size, said diverging tubes having a connecting back for holding same in spaced relationship, said back having a transverse pocket formed therein, one side of which is semi-circular and the opposite side of which opens through the top of the viewer for the insertion of picture discs, each of said discs containing several of said flat right eye view photographs and several of said flat left eye view photographs, a runner rockably mounted in said pocket, said runner having a spring pawl mounted therein adapted to engage one of said picture discs when inserted in said pocket and drive said disc in one direction, a spring pawl mounted on said back engageable with said viewing disc adapted to prevent the movement of said disc in a direction opposite to which it can be driven by said runner, a flange on said runner obstructing the outlet opening of said pocket when said runner is away from a rest position and a spring attached to said back and runner for urging said runner toward a rest position, said runner having viewer openings which register with one said right eye view flat photograph and one said left eye view photograph in said picture disc when said runner is in a rest position, a right eye view polarizing sheet and a left eye view polarizing sheet supported by said back immediately adjacent any of said discs which is at rest in said pocket, each of said polarizing sheets consisting of long narrow strips having a first axis of polarization in conjugate alternate relation with a second series of long narrow strips having a second axis of polarization, said second axis of polarization being rotated 90° from said first axis of polarization, each of said discs contain several openings, each of said openings containing right eye view wide-angle photographs in a series of alternate conjugately related strips upon said flat film and left eye view wide-angle photographs in a series of opposite alternate conjugately related strips upon said flat film, the right of said openings of said discs which registers with the right of said opening of said runner having said right eye view strips in registry with said strips having said first axis of polarization and said left eye view strips in registry with said strips having said second axis of polarization, the left of said openings of said discs which registers with the left of said opening of said runner having said right eye view strips in registry with said strips having said first axis of polarization and said left eye view strips in registry with said strips having said second axis of polarization, said right optical means including a second right polarizing filter, said second right polarizing filter passing only light which has said first axis of polarization to thereby allow light from only right eye view wide-angle photographs to reach the right eye of a viewing observer viewing therein, said left optical means including a second left polarizing filter, said second left polarizing filter passing only light which has said second axis of polarization to thereby allow light from only left eye view wide-angle photographs to reach the left eye of a viewing observer viewing therein.

2. A wide-angle stereoscopic viewer comprising: a pair of diverging tubes, the right of said diverging tubes including a lens system having a prismatic wedge therein in optical alignment with said lens system such that the most narrow prismatic portion is on the right side of the right tube for bending the light rays passing through it through approximately 15° such that said wedge working in conjunction with a right wide-angle eye piece may reproduce a wide-angle right eye view about an axis which is rotated said 15° to the right of the axis of right eye view, said lens system comprising lens surfaces with their radii of curvature respectively oriented optically for converging the rays from the object plane thereof such that the rays from a flat fish-eye picture upon said object plane would enter an observer's right eye substantially as the rays entered the fisheye lens which recorded the fisheye picture when the flat fisheye picture is of a size whereby said radii of curvature and their orientation substantially nullify the inherent distortion of the fisheye picture, the left of said diverging tubes including a lens system having a prismatic wedge therein in optical alignment with said lens system such that the most narrow prismatic portion is on the left side of the left tube for bending the light rays passing through it through approximately 15° such that the left said wedge working in conjunction with a left wide-angle eye piece lens may reproduce a wide-angle left eye view about an axis which is rotated said 15° to the left of said axis of left eye view, the left said lens system comprising lens surfaces with their radii of curvature respectively oriented optically for converging the rays from the object plane thereof such that the rays from a flat fisheye picture upon said object plane would enter an observer's left eye substantially as the rays entered the fisheye lens which recorded the fisheye picture when the flat fisheye picture is of a size whereby said radii of curvature and their orientation substantially nullify the inherent distortion of the fisheye picture the wide-angle right eye view object plane is in substantially the same plane with the wide-angle left eye view object plane, the eye piece lenses being adapted to fit relatively close to the eyes of a viewing observer to enable the eye pieces to provide maximum angles of view and the openings between said eye pieces and the respective said object plane corresponding thereto being wide, thus providing a 3-D effect with an angle of horizontal peripheral vision at least as great as the angle enabled by the wide-angle character and close fitting nature of said eye-pieces plus the angle of divergence, approximately 30°, between said rotated axes, said diverging tubes having a connecting back for holding same in spaced relationship, said back having a transverse pocket with some of the wide openings included as formed therein for holding a wide-angle right eye view flat photograph and a wide-angle left eye view flat photograph visible through said eye pieces.

3. A wide-angle stereoscopic viewer comprising: a pair of diverging tubes, the right of said diverging tubes including a lens system having a prismatic wedge therein in optical alignment with said lens system such that the most narrow prismatic portion is on the right side of the right tube for bending the light rays passing therethrough through approximately 15° such that said wedge working in conjunction with a right wide-angle eye piece may reproduce a wide-angle right eye view about an axis which is rotated said 15° to the right of the axis of right eye view, said lens system comprising lens surfaces with their radii of curvature respectively oriented optically for converging the rays from the object plane thereof such that the rays from a flat fisheye picture upon said object plane would enter an observer's right eye substantially as the rays entered the fisheye lens which recorded the fisheye picture when the flat fisheye picture is of a size whereby said radii of curvature and their orientation substantially nullify the inherent distortion of the fisheye picture, the left of said diverging tubes including a lens system having a prismatic wedge therein in optical alignment with the left lens system such that the most narrow prismatic portion is on the left side of the left tube for bending the light rays passing therethrough through approximately 15° such that said wedge working in conjunction with a left eye piece lens may reproduce wide-angle left eye views about an axis which is rotated said 15° to the left of the axis of left eye view, the left said lens system comprising lens surfaces with their radii of curvature respectively oriented optically for converging the rays from the object plane thereof such that the rays from a flat fisheye picture upon said object plane would enter an observer's left eye substantially as the rays entered the fisheye lens which recorded the fisheye picture when the flat fisheye picture is of a size whereby said radii of curvature and their orientation substantially nullify the inherent distortion of the fisheye picture, the wide-angle right eye view object plane is in the same plane with substantially said left eye view object plane, the eye piece lenses being adapted to fit relatively close to the eyes of a viewing observer to produce a 3-D effect with an angle of view as wide as each said picture plus the angle of divergence between the axes when each said picture is optically centered upon each respective said object plane, said diverging tubes having a connecting back for holding same in spaced relationship, said back having a transverse pocket formed therein, one side of which is semicircular and the opposite side of which opens through the top of the viewer for the insertion of picture discs, each of said discs containing several of said flat right eye view pictures and several of said flat left eye view pictures, a runner rockably mounted in said pocket, said runner having a spring pawl mounted thereon adapted to engage one of said picture discs when inserted in said pocket and drive said disc in one direction, a spring urged pawl mounted on said back engageable with said viewing disc adapted to prevent the movement of said disc in a direction opposite to which it can be driven by said runner, a flange on said runner obstructing the outlet opening of said pocket when said runner is away from rest position and a spring attached to said back and runner for urging said runner toward rest position, said runner having viewing openings of said size which register with one said right eye view flat picture and one said left eye view flat picture in said picture disc when said runner is in a rest position.

4. A wide-angle stereoscopic viewer comprising: a pair of diverging tubes, the right of said diverging tubes containing right eye optical means for reproducing a wide-angle right eye view about an axis, said wide-angle right eye view originating from a wide-angle right eye view object plane, the left of said diverging tubes containing therein left eye optical means for reproducing a wide-angle left eye view about an axis which is rotated to the left of the first said axis such that the intersection of the two axes would be behind the eyes of an observer looking into the viewer if said axes could be extended, said wide-angle left eye view originating from a wide-angle left eye view object plane, said right and left eye optical means including wide-angle oculars optically centered with their respective optical axes substantially along the diverging axes and adapted to fit relatively close to the eyes of a viewing observer and said diverging tubes including wide openings optically aligned between said oculars and each respective said object plane to thus enable the wide-angle produced by the wide angle character and close fitting nature of said oculars in conjunction with said wide openings to be additionally increased horizontally by the angle of divergence between the optical axes of said oculars, means attached to said diverging tubes including said openings for holding right and left photographs at the right and left object planes in registration with said openings.

5. A wide-angle stereoscopic viewing device for use with stereoscopic pairs of flat images having diverging axes of recording, comprising: means for supporting a substantially flat image element upon a substantially flat focal surface; right and left wide-angle oculars supported by two diverging tubes attached to said means such that the ocular focal plane is said flat surface, the respective right and left oculars comprising: respective wedge means in optical alignment with the respective narrow prismatic portions thereof on the right side of the right tube and the left side of the left tube for refracting prismatically the rays passing therethrough from said focal surface such that their axes are rotated to enter the respective eyes of a viewer such that the intersection of said axes would be to the rear of said eyes if said axes could be extended and lens surfaces with their radii of curvature respectively oriented optically for converging the rays from the focal plane of said oculars such that the rays from a fisheye picture thereat would enter an observer's eyes substantially as they entered stereo-coupled fisheye taking lenses when the fisheye picture is of a size whereby said radii of curvature and their orientation substantially nullify the inherent distortion of the fisheye picture and that the said eyes can focus said rays upon the retinas thereof at wide angles of view about each of said rotated axes; the first said means including a transverse slot for transversely receiving and supporting cards carrying pictures upon said surface.

(References on following page)

References Cited

UNITED STATES PATENTS

| | | | |
|---|---|---|---|
| 625,627 | 5/1899 | Woody | 350—132 |
| 2,189,285 | 2/1940 | Grauber | 350—134 |
| 2,241,041 | 5/1941 | Sauer | 350—132 X |
| 2,317,875 | 4/1943 | Athey et al. | 350—132 |
| 2,955,156 | 10/1960 | Heilig | 350—133 X |
| 2,511,334 | 6/1950 | Gruber | 350—134 |
| 3,050,870 | 8/1962 | Heilig | 350—133 X |

FOREIGN PATENTS

| | | |
|---|---|---|
| 83,149 | 8/1918 | Switzerland. |
| 506,022 | 5/1920 | France. |

DAVID SCHONBERG, Primary Examiner

P. R. GILLIAM, Assistant Examiner